United States Patent [19]

Capocci

[11] 4,017,428

[45] Apr. 12, 1977

[54] ABRASION RESISTANT, NON-DISCOLORING POLYURETHANE FOAMS AND METHOD OF MAKING

[75] Inventor: Gerald A. Capocci, Port Chester, N.Y.

[73] Assignee: The United States of America as represented by the Secretary of the Army, Washington, D.C.

[22] Filed: June 10, 1975

[21] Appl. No.: 585,536

[52] U.S. Cl. .................. 260/2.5 AM; 260/2.5 AP; 260/2.5 AT
[51] Int. Cl.² ......................................... C08J 9/00
[58] Field of Search ............... 260/2.5 AT, 2.5 AM, 260/2.5 AP

[56] References Cited

UNITED STATES PATENTS

| | | | |
|---|---|---|---|
| 3,454,505 | 7/1969 | Cross et al. | 260/2.5 AT |
| 3,565,768 | 2/1971 | Grant, Jr. et al. | 260/2.5 AT |
| 3,590,002 | 6/1971 | Powers | 260/2.5 AT |
| 3,625,986 | 12/1971 | Feldman et al. | 260/2.5 AT |
| 3,645,924 | 2/1972 | Fogiel | 260/2.5 AT |
| 3,694,386 | 9/1972 | Hoeschele | 260/2.5 AT |
| 3,790,508 | 2/1974 | Triolo | 260/2.5 AT |
| 3,925,319 | 12/1975 | Hiatt et al. | 260/2.5 AT |

*Primary Examiner*—Eugene C. Rzucidlo
*Attorney, Agent, or Firm*—Nathan Edelberg; Robert P. Gibson; Charles C. Rainey

[57] ABSTRACT

Polyurethane foams having high resistance to abrasion, discoloration, and shrinkage and having high densities are produced by reacting a polyether diol with a cycloaliphatic diisocyanate, or with a prepolymer of a polyether diol and a cycloaliphatic diisocyanate, and one or more curing agents in the presence of small proportions of water to serve as a blowing agent, a surfactant, and a catalyst.

10 Claims, No Drawings

ABRASION RESISTANT, NON-DISCOLORING POLYURETHANE FOAMS AND METHOD OF MAKING

The invention described herein may be manufactured, used, and licensed by or for the Government for governmental purposes without the payment to me of any royalties thereon.

BACKGROUND OF THE INVENTION

This invention relates to a process for producing a polyurethane foam having a high abrasion index and high resistance to discoloration and shrinkage, and preferably having a high density, which is particularly useful in the outsoles of cold weather boots. More particularly, the invention relates to predominantly open cell, water blown, polyurethane foams made from a polyether diol and a cycloaliphatic diisocyanate and having good low temperature properties.

Polyurethane foams of the prior art have been notoriously lacking in abrasion resistance. Many of them have been characterized by having a tendency to discolor badly, as by turning yellow, when exposed to ultraviolet light for prolonged periods of time. Many of them have also had a tendency to shrink considerably during molding thereof after having been formed into a desired shape, as by directly molding on a boot or shoe as an outsole. These deficiencies in the prior art polyurethane foams have militated against their utilization in the manufacture of boots for military use in low temperature environments where retention of good camouflage against a snow-covered background is very important along with high resistance to abrasion and good flexibility and strength at low temperatures.

It is, therefore, an object of the present invention to provide a process for producing polyurethane foam having high resistance to abrasion, discoloration, and shrinkage and characterized by good flexibility and strength at low temperatures.

A further object is to provide predominantly open cell, water blown, polyurethane foams made from a polyether diol and a cycloaliphatic diisocyanate having high resistance to abrasion, discoloration and shrinkage and possessing high densities and good low temperature properties.

Other objects and advantages will appear from the following description, and the novel features will be particularly pointed out in connection with the appended claims.

SUMMARY OF THE INVENTION

The objects of the invention are accomplished by reacting and foaming a reaction mixture comprising:

a. a polyether diol having a molecular weight of about 2000;
b. a polyurethane-forming agent, which may be a cycloaliphatic diisocyanate, or may be a prepolymer formed by reacting a polyether diol with a cycloaliphatic diisocyanate short of producing a high polymer;
c. one or more curing agents;
d. water (a blowing agent);
e. a surfactant; and
f. a catalyst for the polyurethane-forming reaction;

the polyether diol and the polyurethane-forming agent, taken together, being present in the reaction mixture in a major amount and in the relative amounts required to produce the polyurethane foam. The reaction temperature is maintained below about 140° F. to obtain a predominantly open cell, non-shrinking, non-discoloring polyurethane foam having a relatively high density, such high densities being in the range of from about 30 to about 50 pounds per cubic foot.

DESCRIPTION OF THE PREFERRED EMBODIMENT

The following example illustrates the best method known for carrying the invention into practice:

EXAMPLE 1

Two separate mixtures were prepared of the following ingredients in the quantities stated:

Component Mixture A:

| Component | Weight (gms.) |
|---|---|
| Prepolymer "ECD 3056" | 103.93 |
| 4,4 methylenebis cyclohexyl isocyanate | 13.16 |

Component Mixture B:

| Component | Weight (gms.) |
|---|---|
| Polytetramethylene ether glycol (molecular weight 2000) | 21.14 |
| 1,4 butanediol | 5.50 |
| Trimethylol propane | 1.30 |
| Water | 0.22 |
| Dibutyltin dilaurate (catalyst) | 1.00 |
| Silicone-glycol copolymer surfactant (Dow Corning DC-195) | 1.00 |

Prepolymer "ECD 3056" was a prepolymer of polytetramethylene ether glycol and 4,4 methylenebis cyclohexyl isocyanate having a free NCO value of 4.28% by weight, manufactured by E. I. du Pont de Nemours & Co., Inc.

The 4,4 methylenebis cyclohexyl isocyanate used was "Hylene W", also manufactured by E. I. du Pont de Nemours & Co., Inc.

The polyether diol used was "Polymeg 2000", manufactured by Quaker Oats Chemical Co., which has a molecular weight of about 2000.

Component Mixture A was prepared by adding the 4,4 methylenebis cyclohexyl isocyanate to the prepolymer "ECD 3056". The resulting mixture had a free NCO value of 7.04% by weight.

Component Mixture B was prepared by melting the polytetramethylene ether glycol (polyether diol) and the trimethylol propane in separate containers and adjusting their temperatures to 125° F. The trimethylol propane was then dissolved in the 1,4 butanediol and to this mixture were added the water, the silicone-glycol copolymer surfactant, as the dibutyltin dilaurate. The resulting mixture was added to the polytetramethylene ether glycol to complete the formation of Component Mixture B. The temperature of each of the component mixtures was adjusted to 125° F. The two component mixtures were combined and thoroughly mixed in a mold to form a blown polyurethane foam in about 5 minutes.

The resulting polyurethane foam, when cooled to room temperature, had a density of 44.6 lbs. per cu. ft.

and an abrasion index of 227, the latter being determined in accordance with A.S.T.M. Standard D1630, "Abrasion Resistance Of Rubber Compounds For Soles And Heels". This is a relatively high abrasion index when compared with conventional polyurethane foams, which in most cases have abrasion indices below about 50. The polyurethane foam was found to be larely of open cell structure. It was also found to be highly resistant to yellowing discoloration when exposed to ultraviolet light over a long period of time. The polyurethane foam was quite flexible and strong at room temperature, retained good flexibility characteristics at low temperatures, and exhibited good resistance to shrinking during molding thereof.

It is to be understood that variations may be made in the specific proportions of the components employed in producing foams in accordance with the invention. The amount of polytetramethylene ether glycol may be varied considerably, both as used in the prepolymer in Component Mixture A and as the polytetramethylene ether glycol in Component Mixture B. Foams prepared from 2000 molecular weight polytetramethylene ether glycol have shown the best low temperature flexibility characteristics.

It is desirable in general that the mixture of Component Mixture A and Component Mixture B, which is reacted to produce the polyurethane foam, contain from about 61 to about 69 percent by weight of the polyether diol, from about 23 to about 31 percent by weight of the diisocyanate, including that which is contained in any prepolymer employed in preparing Component Mixture A, from about 2.8 to about 4.5 percent by weight of the curing agents, from about 0.15 to about 0.24 percent by weight of water to serve as blowing agent in producing the foam, and from about 0.4 to about 6.0 percent and preferably from about 3.0 to about 6.0 percent of the catalyst.

It is preferable that no aromatic diisocyanates be present in the reaction mixture since these tend to cause yellowing discoloration of the resulting polyurethanes when they are exposed to ultraviolet light; and one of the most useful applications for the polyurethane foams of the present invention is in cold-weather combat boots where discoloration would tend to decrease the camouflage value of the boots against a snow-covered background.

Both 1,4 butanediol and the trimethylol propane serve as curing agents; more specifically, 1,4 butanediol serves as a chain extender and trimethylol propane serves as a cross-linking agent. It is preferred, for obtaining the most desirable physical properties in the resulting polyurethane foams, that these two agents be used in combination, although foams having reasonably good properties for some purposes may be produced using 1,4 butanediol alone as a chain extender.

Other catalysts may be employed in the reaction mixture. For example, stannous octoate may be used for this purpose.

Other surfactants, such as silicone-glycol copolymer surfactant "DC193", manufactured by Dow Corning Corp., may be used. Also other surfactants which are well-known in the art of making polyurethane foams, especially those which tend to produce open cell type polyurethane foams, may be used in the process. However, the silicone-glycol copolymer type surfactants have been found preferable, and of these the preferred surfactant is "DC 195", a silicone-glycol copolymer, manufactured by Dow Corning Corp. and having the following properties:
Viscosity at 77° F., centistokes 325;
Specific Gravity at 77° F. 1.07;
Refractive Index at 77° F. 1.4540;
Color, Gardner Scale 4;
Hydroxyl Content (Infrared Method) percent 2.0;

It is to be understood that for the purposes of the specification and claims a high abrasion index, as determined in accordance with A.S.T.M. Standard D1630, "Abrasion Resistance OF Rubber Compounds For Soles And Heels", is an abrasion index above about 100.

The polyurethane foams made in accordance with the invention are most useful in products and for purposes requiring high abrasion resistance and high resistance to discoloration, especially against discoloration of the variety induced in so many known polyurethane foam products when used outdoors and exposed over long periods of time to sunlight or other sources of ultraviolet radiations. They have been found particularly advantageous in military combat boots, especially those used in the arctic or subarctic regions where even a small degree of discoloration may greatly increase the hazards of military operations because of losses of camouflage characteristics in any clothing or equipment worn or carried by a soldier in such environments. Good abrasion resistance, such as that of the polyurethane foams of the invention, is very important, particularly when the foams are molded on or otherwise applied to combat boots as the outsoles thereof. Good flexibility at very low temperatures, such as that of the polyurethane foams of the invention is, of course, very important to their use in combat boots to permit easy bending of the outsoles without cracking or splitting thereof within a short period of use.

It will be understood, of course, that various changes in the details and materials which have been herein described in order to explain the nature of the invention, may be made by those skilled in the art within the principle and scope of the invention.

I claim:
1. A process for producing a predominantly open celled, polyurethane foam having a density of from about 30 to about 50 pounds per cubic foot and a high abrasion index by reacting and foaming at a reaction temperature maintained below about 140° F. a reaction mixture comprising:
 a. a polyether diol having a molecular weight of about 2000;
 b. a polyurethane-forming agent selected from the group consisting of a cycloaliphatic diisocyanate, a prepolymer of a polyether diol having a molecular weight of about 2000 and a cycloaliphatic diisocyanate, and mixtures of the foregoing polyurethane-forming agents;
 c. a curing agent selected from the group consisting of 1,4 butanediol and trimethylol propane;
 d. from about 0.15 to about 0.24 percent by weight of water;
 e. a surfactant; and
 f. a catalyst for the polyurethane-forming reaction;
  said polyether diol and said polyurethane-forming agent, taken together, being present in the reaction mixture in a major amount and in relative amounts required to produce said polyurethane foam.

2. Process according to claim 1, wherein said polyether diol is polytetramethylene ether glycol having a molecular weight of about 2000.

3. Process according to claim 2, wherein said polyurethane-forming agent is 4,4 methylenebis cyclohexyl isocyanate.

4. Process according to claim 2, wherein said polyurethane-forming agent is a prepolymer produced by the reaction of polytetramethylene ether glycol having a molecular weight of about 2000 with 4,4 methylenebis cyclohexyl isocyanate.

5. Process according to claim 2, wherein said polyurethane-forming agent is a mixture of (a) a prepolymer produced by the reaction of polytetramethylene ether glycol having a molecular weight of about 2000 with 4,4 -methylenebis cyclohexyl isocyanate and (b) 4,4 -methylenebis cyclohexyl isocyanate.

6. Process according to claim 5, wherein the ratio of component (a) to component (b) of said mixture is about 7.9:1.

7. Process according to claim 1, wherein said surfactant is a siliconeglycol copolymer.

8. A dense, highly abrasion resistant, non-discoloring polyurethane foam, having good flexibility at low temperatures, produced in accordance with the process of claim 1.

9. Process according to claim 2, wherein said curing agent is a mixture of 1, 4 butanediol and trimethylol propane, said surfactant is a silicone-glycol copolymer, and said catalyst is dibutyltin dilaurate.

10. A polyurethane foam having a density of from about 30 to about 50 pounds per cubic foot and an abrasion index above about 100, produced in accordance with the process according to claim 9.

* * * * *